United States Patent
Hammersberg et al.

(10) Patent No.: US 12,380,308 B2
(45) Date of Patent: Aug. 5, 2025

(54) ENROLLMENT ASSISTANCE DEVICE WITH ELECTRONIC LABEL, AND MANUFACTURING METHOD

(71) Applicant: FINGERPRINT CARDS ANACATUM IP AB, Gothenburg (SE)

(72) Inventors: Johan Hammersberg, Floda (SE); Harald Ripa, Bjärred (SE); Erik Naeslund, Floda (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 18/723,953

(22) PCT Filed: Dec. 28, 2022

(86) PCT No.: PCT/SE2022/051248
§ 371 (c)(1),
(2) Date: Jun. 25, 2024

(87) PCT Pub. No.: WO2023/132770
PCT Pub. Date: Jul. 13, 2023

(65) Prior Publication Data
US 2025/0094754 A1    Mar. 20, 2025

(30) Foreign Application Priority Data
Jan. 10, 2022 (SE) .................................... 2250006-0

(51) Int. Cl.
*G06K 19/07* (2006.01)
*G06K 19/077* (2006.01)

(52) U.S. Cl.
CPC ..... *G06K 19/0702* (2013.01); *G06K 19/0718* (2013.01); *G06K 19/07707* (2013.01)

(58) Field of Classification Search
CPC .......... G06K 19/0702; G06K 19/0718; G06K 19/07707
(Continued)

(56) References Cited

U.S. PATENT DOCUMENTS 10,963,715 B2 * 3/2021 Li .......................... G06V 40/70
11,055,683 B1 * 7/2021 Bartholomew ...... G06Q 20/341
(Continued)

FOREIGN PATENT DOCUMENTS

CN    111178482 A    5/2020
WO    2020240430 A1   12/2020

OTHER PUBLICATIONS

International Search Report and Written Opinion for International Application No. PCT/SE2022/051248, dated Mar. 9, 2023.

*Primary Examiner* — Ahshik Kim
(74) *Attorney, Agent, or Firm* — Westman, Champlin & Koehler, P.A.

(57) ABSTRACT

An enrollment assistance device, for facilitating biometric enrollment of a user of a smartcard including a biometric arrangement and a power and communication interface, the enrollment assistance device comprising: a carrier having a first side and a second side opposite the first side; and an electronic label comprising: a card interface portion including an electrically conducting structure; a power supply portion including an electrically conducting structure for receiving electric power from a power source; and electrical circuitry connecting the electrically conducting structure of the power supply portion with the electrically conducting structure of the card interface, wherein the electronic label is folded around an edge of the carrier in such a way that the card interface portion of the electronic label is attached to (Continued)

the first side of the carrier, and the power supply portion of the electronic label is attached to the second side of the carrier.

12 Claims, 4 Drawing Sheets

(58) Field of Classification Search
USPC .......................................................... 235/380
See application file for complete search history.

(56) References Cited

U.S. PATENT DOCUMENTS

| | | |
|---|---|---|
| 11,769,030 B2 | 9/2023 | Roessner et al. |
| 2014/0154686 A1* | 6/2014 | Horton .................. B01L 3/5055 |
| | | 435/7.1 |
| 2020/0311509 A1 | 10/2020 | Benkley, III et al. |
| 2020/0349408 A1 | 11/2020 | Prawitz et al. |
| 2021/0374218 A1 | 12/2021 | Humborstad et al. |
| 2022/0230037 A1 | 7/2022 | Roessner et al. |
| 2024/0187408 A1* | 6/2024 | Köhn ....................... G06F 21/32 |

\* cited by examiner

ENROLLMENT ASSISTANCE DEVICE WITH ELECTRONIC LABEL, AND MANUFACTURING METHOD

CROSS-REFERENCE TO RELATED APPLICATION

This Application is a Section 371 National Stage Application of International Application No. PCT/SE2022/051248, filed Dec. 28, 2022, which claims priority to Swedish Patent Application No. 2250006-0 filed on Jan. 10, 2022, and published as WO 2023/132770 A1 on Jul. 13, 2023, in English, the entire contents of which are hereby incorporated by reference in their entireties.

FIELD OF THE INVENTION

The present invention relates to an enrollment assistance device, for facilitating biometric enrollment of a user of a smartcard including a biometric arrangement, and to a method of manufacturing such an enrollment assistance device.

BACKGROUND OF THE INVENTION

Biometric arrangements are widely used as means for increasing the convenience and security of personal electronic devices, such as mobile phones etc. Fingerprint sensing arrangements, in particular, are now included in a large proportion of all newly released personal communication devices, such as mobile phones.

Lately, efforts have also been made to introduce biometric arrangements, such as fingerprint sensing arrangements, in other devices that may have less computing power and/or available energy. Examples of such other devices are so-called smartcards, door locks, and devices in the so-called internet of things (IoT) category etc.

It is known to send a new biometrically enabled smartcard to a user together with a plastic enrollment sleeve, that may have a battery included or a USB-connection. However, distributing such plastic enrollment sleeves in large numbers essentially only for one time use in connection with initial enrollment of the user of the smartcard is costly and problematic from an environmental perspective.

It would therefore be desirable to provide for enrollment in a biometrically enabled smartcard at a lower cost and with a reduced environmental impact.

SUMMARY

In view of above-mentioned and other drawbacks of the prior art, it is an object of the present invention to provide for improved, in particular less costly and more environmentally-friendly, enrollment in a biometrically enabled smartcard.

According to a first aspect of the present invention, it is therefore provided an enrollment assistance device, for facilitating biometric enrollment of a user of a smartcard including a biometric arrangement and a power and communication interface, the enrollment assistance device comprising: a carrier having a first side configured to face the smartcard during the biometric enrollment, and a second side opposite the first side; and an electronic label comprising: a card interface portion including an electrically conducting structure for interaction with the power and communication interface of the smartcard; a power supply portion including an electrically conducting structure for receiving electric power from a power source; and electrical circuitry connecting the electrically conducting structure of the power supply portion with the electrically conducting structure of the card interface portion to allow supply of power from the power source to the smartcard, wherein the electronic label is folded over an edge of the carrier in such a way that the card interface portion of the electronic label is attached to the first side of the carrier, and the power supply portion of the electronic label is attached to the second side of the carrier.

The present invention is based upon the realization that the electrical functionality needed to enable biometric enrollment of a user of a biometrically-enabled smartcard can be achieved by an electronic label, and that the functionality of accommodating the smartcard for protection during distribution, and arrangement in relation to the electronic label can be achieved using simple materials that are easy to recycle.

Since electronic labels are cost-efficient to mass-produce and use minimal resources in relation to the provided functionality, the enrollment procedure can be made more cost-efficient, and with a reduced environmental impact. For example, due to the small dimensions achievable using the enrollment assistance device according to embodiments of the present invention, the enrollment assistance device can therefore be distributed to users together with, or separately from, a smartcard with a biometric arrangement, with reduced cost and environmental impact.

The enrollment assistance device may, furthermore, be included in an enrollment kit, further comprising a smartcard including a biometric arrangement and a power and communication interface.

The enrollment assistance device may, moreover, be included in a biometric system, further comprising a smartcard including a biometric arrangement and a power and communication interface, wherein the power and communication interface of the smartcard is arranged in relation to the card interface portion of the electronic label of the enrollment assistance device in such a way that power can be provided from the enrollment assistance device to the smartcard.

According to a second aspect of the present invention, there is provided a method of manufacturing an enrollment assistance device, comprising: providing a carrier having a first side and a second side opposite the first side, and an electronic label comprising a card interface portion, a power supply portion, and electrical circuitry connecting the power supply portion and the card interface portion; attaching at least the card interface portion of the electronic label to the first side of the carrier; and attaching at least the power supply portion of the electronic label to the second side of the carrier.

In summary, the present invention thus relates to an enrollment assistance device, for facilitating biometric enrollment of a user of a smartcard including a biometric arrangement and a power and communication interface, the enrollment assistance device comprising: a carrier having a first side and a second side opposite the first side; and an electronic label comprising: a card interface portion including an electrically conducting structure; a power supply portion including an electrically conducting structure for receiving electric power from a power source; and electrical circuitry connecting the electrically conducting structure of the power supply portion with the electrically conducting structure of the card interface, wherein the electronic label is folded over an edge of the carrier in such a way that the card interface portion of the electronic label is attached to the first side of the carrier, and the power supply portion of the electronic label is attached to the second side of the carrier.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

Figure 1A:
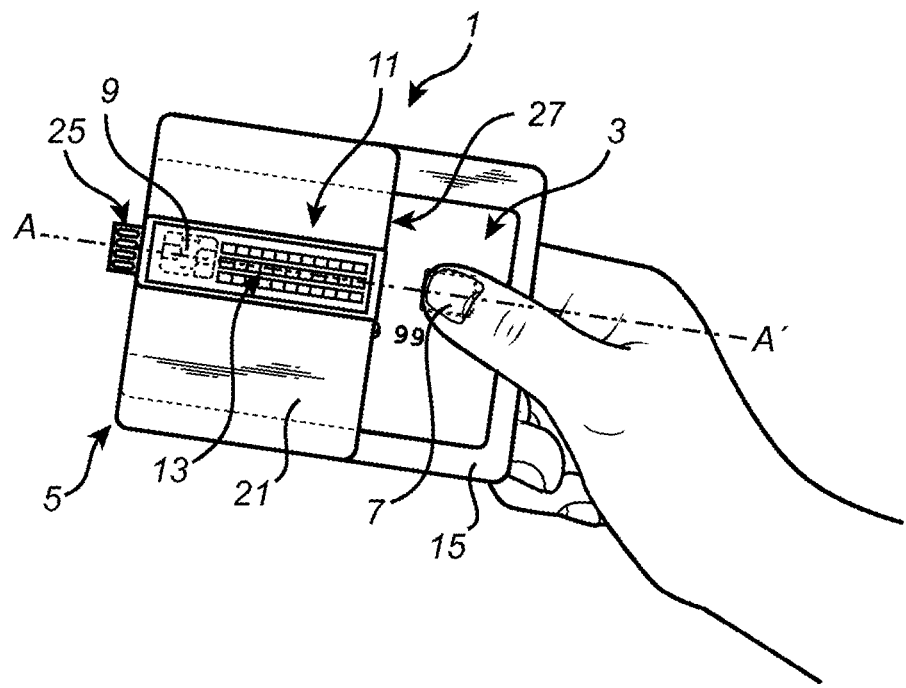
FIG. 1A is an illustration of a biometric system comprising a biometrically enabled smartcard and an enrollment assistance device according to an embodiment of the present invention.
Figure 1B:
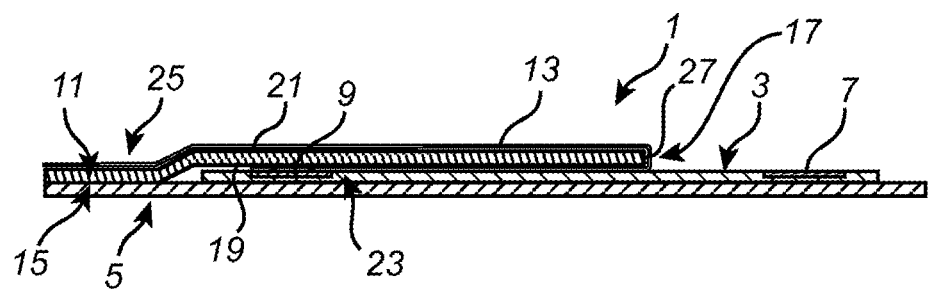
FIG. 1B is a cross-section view of the biometric system in FIG. 1A.

FIG. 1A-B are illustrations of a biometric system 1 comprising a biometrically enabled smartcard 3 and an enrollment assistance device 5 according to an embodiment of the present invention.

As is schematically indicated in FIGS. 1A-B, the smartcard 3 comprises a biometric arrangement 7, here in the form of a fingerprint sensor module, and a power and communication interface 9, here in the form of an ISO-contact (a contact with contact pads provided in accordance with the international standard ISO/IEC 7816).

The smartcard 3 may, for example, be a biometrically enabled payment card, and payments may be authorized by biometrically authenticating the user, as is schematically indicated in FIG. 1A. Of course, a payment card such as that shown in FIG. 1A is not the only kind of biometrically enabled smartcard for which embodiments of the present invention may be useful. Examples of other kinds of biometrically enabled smartcards may include access cards, storage cards, identity cards, etc. Furthermore, the biometric arrangement 7 and the power and communication interface 9 need not be arranged exactly as indicated in FIGS. 1A-B. For instance, the biometric arrangement 7 and the power and communication interface 9 may be arranged adjacent to each other, in a "side-by-side" configuration. An advantage of such a configuration may be that the smartcard production can be made more efficient. It would be straight-forward for the skilled person to modify the enrollment assistance device 5 described herein for different arrangements of the biometric arrangement 7 and the power and communication interface 9, based on the description provided.

As can be seen in FIGS. 1A-B, the enrollment assistance device 5 comprises a carrier 11 and an electronic label 13. In the example configuration of FIGS. 1A-B, the enrollment assistance device 5 additionally comprises a base structure 15, to which the carrier 11 is joined to form a pocket 17 (see FIG. 1B) for receiving the smartcard 3. It should be noted that a separate base structure 15 is not essential for the enrollment assistance device 5 of the invention. The pocket 17 may alternatively be formed by folding the carrier 11 back over itself. According to another alternative, the enrollment assistance device 5 may lack a pocket, and the smartcard may be arranged in relation to the carrier 11 and electronic label 13 by other means. For instance, the enrollment assistance device 5 may be temporarily attached to the smartcard 3 by releasable adhesive, or the enrollment assistance device may be pressed against the smartcard 3.

With continued reference to FIGS. 1A-B, the carrier 11 has a first side 19 configured to face the smartcard 3 during the biometric enrollment, and a second side 21 opposite the first side 19. As will be described in greater detail further below, the electronic label 13 comprises a card interface portion 23 (see FIG. 1B) and a power supply portion 25, and is folded over an edge 27 of the carrier 11 in such a way that the card interface portion 23 is attached to the first side 19 of the carrier 11 and the power supply portion 25 is attached to the second side 21 of the carrier 11.

The parts of the biometric system 1 in FIGS. 1A-B may be delivered to the user in the form indicated in the drawings, or, alternatively, as an enrollment kit with the smartcard 3 and the enrollment assistance device 5 as separate parts, for the user to assemble (such as by inserting the smartcard 3 in the pocket 17).

Figure 2:
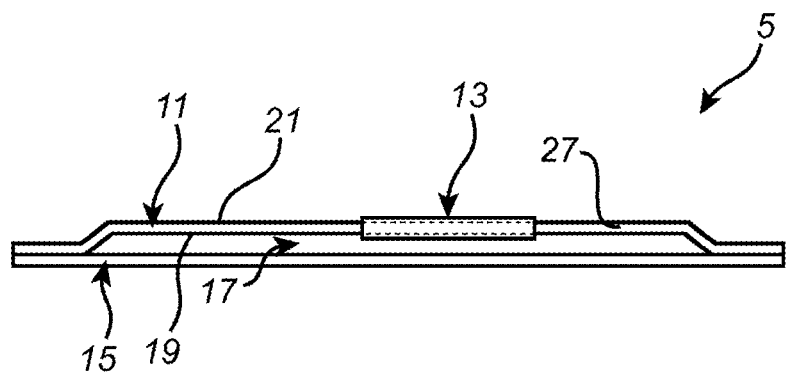
FIG. 2 is a side view of the enrollment assistance device in FIGS. 1A-B, without the smartcard inserted.

FIG. 2 is a side view of the enrollment assistance device 5 in FIGS. 1A-B, without the smartcard inserted in the pocket 17 formed between the carrier 11 and the base structure 15. FIG. 2 clearly shows how the electronic label 13 is folded over the edge 27 of the carrier 11.

The carrier 11 and/or the base structure 15 may advantageously be made of cardboard, which is a cost-efficient and environmentally friendly material.

Figure 3:
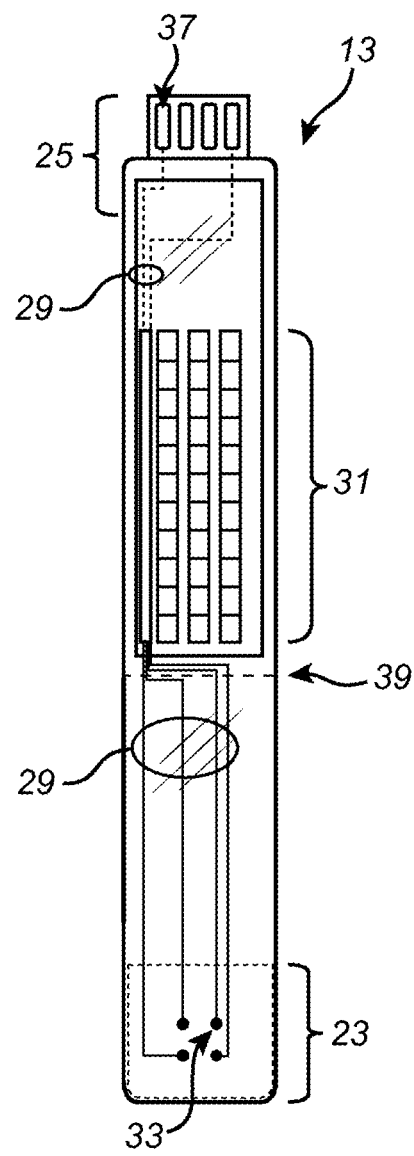
FIG. 3 is a schematic illustration of a first example configuration of an electronic label for the enrollment assistance device according to embodiments of the present invention.

FIG. 3 is a schematic illustration of a first example configuration of an electronic label 13 for the enrollment assistance device 5 according to embodiments of the present invention. FIG. 3 is a top view of the electronic label 13, showing the top side of the electronic label 13. The bottom side of the electronic label may advantageously be provided with an adhesive, as is per se known, to allow convenient attachment of the electronic label 13 to the carrier 11.

In addition to the above-mentioned card interface portion 23 and power supply portion 25, the first example configuration of the electronic label 13 in FIG. 3 comprises electrical circuitry 29, here schematically shown as conductor traces, and a visual feedback portion 31 for providing visual feedback to the user about the progress of the enrollment procedure. In embodiments, the visual feedback portion 31 may comprise a display, such as an electrochromic display and a shift register or similar circuitry for controlling the display. In the first example configuration of the electronic label 13 shown in FIG. 3, the card interface portion 23 includes an electrically conductive structure for interaction with the power and communication interface of the smartcard 3. In this example configuration, the electrically conductive structure is provided in the form of contact structures 33 arranged to make electrical contact with contact pads according to ISO/IEC 7816, on the smartcard 3. The power supply portion 25 of the electronic label 13 includes electrically conducting structures for receiving electric power from a power source. In the example configuration of FIG. 3, the electrically conducting structures are provided in the form of USB contact pads 37. The above-mentioned electrical circuitry 29 connects the electrically conducting structures 37 of the power supply portion 25 with the electrically conducting structures 33 of the card interface portion 23. In the example configuration of the electronic label 13 in FIG. 3, the electrical circuitry 29 additionally provides for supply of power and data to the visual feedback portion 31.

Figure 4:
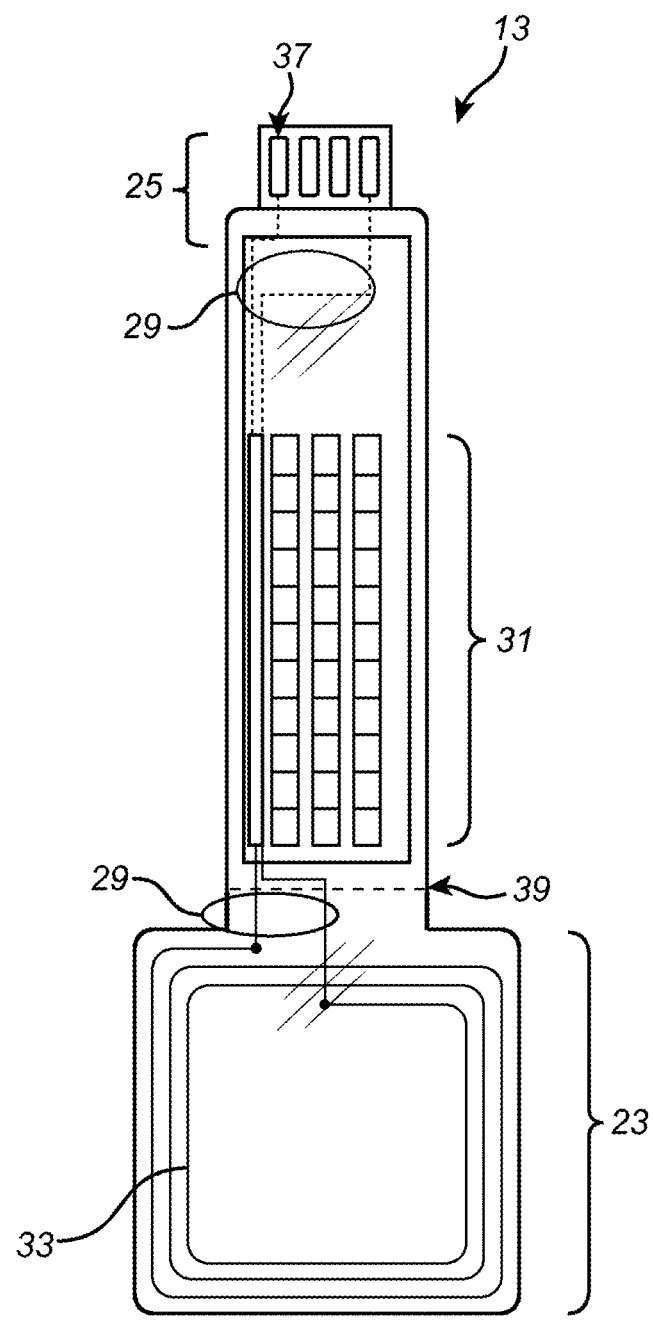
FIG. 4 is a schematic illustration of a second example configuration of an electronic label for the enrollment assistance device according to embodiments of the present invention.

The second example configuration of the electronic label 13, schematically shown in FIG. 4, mainly differs from the first example configuration in FIG. 3 in that the card interface portion 23 of the electronic label comprises a wireless power transfer arrangement, where the electrically conducting structure 33 of the card interface portion 23 is provided in the form of a coil. The coil is configured for wireless provision of power to a corresponding coil comprised in a so-called contactless smartcard 3. In embodiments, the provision of power (and the load) may be modulated in order to transmit and receive data in per se known ways. As will be well known to the skilled person, this example configuration of the electronic label 13 may be provided with processing circuitry for handling the wireless communication (in embodiments utilizing wireless communication).

As an alternative to the USB contact pads 37 in FIG. 3 and FIG. 4, the plurality of contact pads 37 of the power supply portion 25 of the electronic label 13 may comprise a first contact pad for connection to a plus pole of a battery and a second contact pad for connection to a minus pole of a battery.

As a further alternative to the USB contact pads 37 in FIG. 3 and FIG. 4, the electrically conducting structure in the power supply portion 25 of the electronic label 13 may be provided in the form of a coil for wireless provision of power to the electronic label 13 and/or to the smartcard 3. In such embodiments, the electronic label 13 may further be provided with rectifier circuitry and voltage regulating circuitry to condition to power received via the coil for use by the smartcard 3.

A method of manufacturing an enrollment assistance device 5 according to embodiments of the present invention will now be described with main reference to FIGS. 5A-B.

Figure 5A:
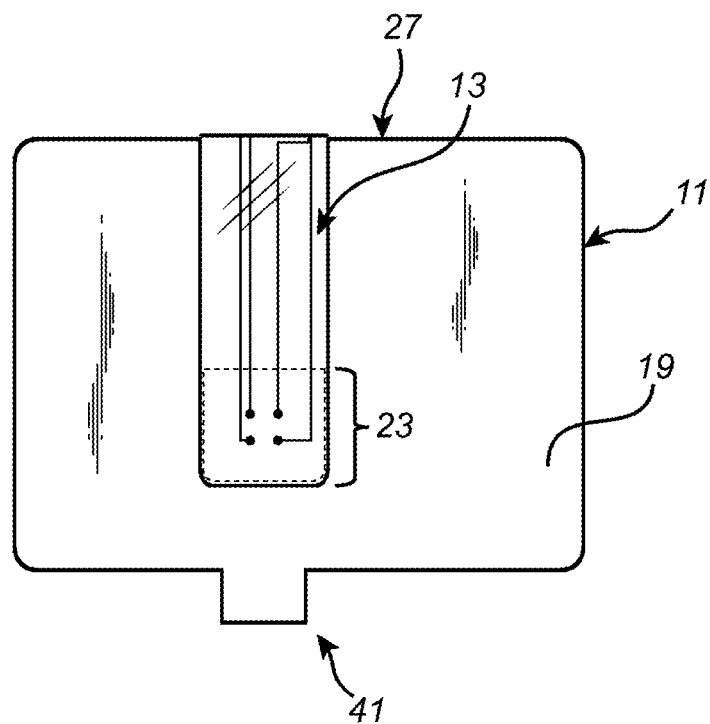
FIGS. 5A-B are plane views of the carrier of the enrollment assistance device according to example embodiments of the present invention, having the electronic label in FIG. 3 attached thereto.
Figure 5B:
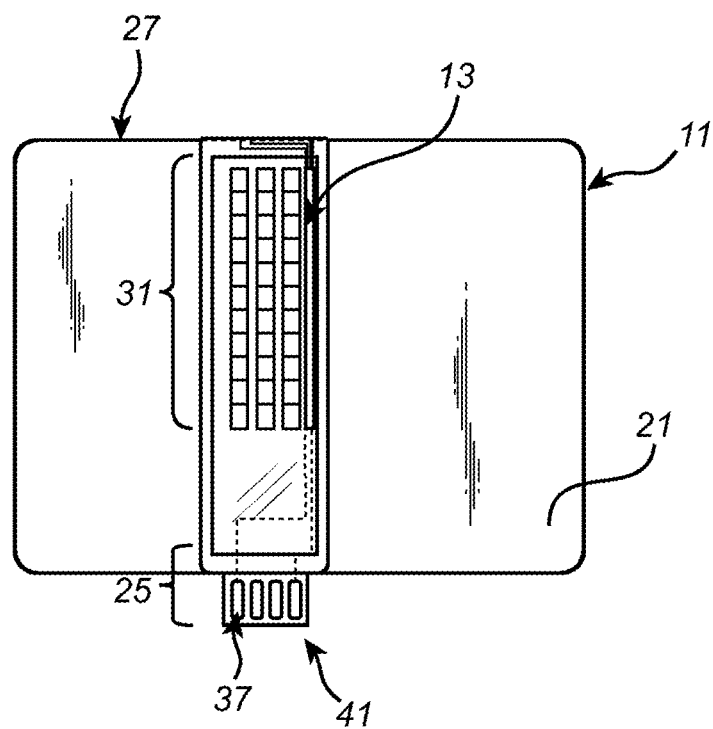

FIGS. 5A-B are plane views of the carrier 11 of the enrollment assistance device 5, having the electronic label 13 in FIG. 3 attached thereto. In FIG. 5A, the first side 19 of the carrier 11 is facing up, and in FIG. 5B, the second side 21 of the carrier 11 is facing up.

According to embodiments of the method according to the present invention, a carrier 11 having a first side 19 and a second side 21, opposite the first side 19, is provided. An electronic label 13 comprising a card interface portion 23, a power supply portion 25, and electrical circuitry 29 connecting the power supply portion 25 and the card interface portion 23 is also provided. At least the card interface portion 23 of the electronic label 13 is attached to the first side 19 of the carrier, and at least the power supply portion 25 of the electronic label 13 is attached to the second side 21 of the carrier 11. To achieve this, the electronic label 13 is folded over the edge 27 of the carrier 11, along the fold line 39 of the electronic label 13 indicated in FIG. 3 and FIG. 4.

In the example configuration indicated in FIGS. 5A-B, the power supply portion 25 of the electronic label 13 comprises a plurality of contact pads 37 and the carrier 11 comprises a protrusion 41. As is schematically shown in FIGS. 5A-B, the electronic label 13 is aligned with the carrier 11 in such a way that the contact pads 37 are arranged at an end of the protrusion 41 of the carrier, so that the protrusion 41 and the contact pads 37 together form a plug for insertion in a socket.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. An enrollment assistance device, for facilitating biometric enrollment of a user of a smartcard including a biometric arrangement and a power and communication interface, the enrollment assistance device comprising:
a carrier having a first side configured to face the smartcard during the biometric enrollment, and a second side opposite the first side; and
an electronic label comprising:
a card interface portion including an electrically conducting structure for interaction with the power and communication interface of the smartcard;
a power supply portion including an electrically conducting structure for receiving electric power from a power source; and
electrical circuitry connecting the electrically conducting structure of the power supply portion with the electrically conducting structure of the card interface portion to allow supply of power from the power source to the smartcard,
wherein the electronic label is folded over an edge of the carrier in such a way that the card interface portion of the electronic label is attached to the first side of the carrier, and the power supply portion of the electronic label is attached to the second side of the carrier.

2. The enrollment assistance device according to claim 1, further comprising a base structure, wherein the carrier is joined to the base structure in such a way that a pocket is formed between the base structure and the first side of the carrier for receiving the smartcard.

3. The enrollment assistance device according to claim 1, wherein the card interface portion of the electronic label comprises contact structures arranged to make electrical contact with contact pads according to ISO/IEC 7816.

4. The enrollment assistance device according to claim 1, wherein the card interface portion of the electronic label comprises a wireless power transfer arrangement.

5. The enrollment assistance device according to claim 1, wherein the power supply portion of the electronic label comprises a plurality of contact pads.

6. The enrollment assistance device according to claim 5, wherein:
the carrier comprises a protrusion; and
the contact pads of the power supply portion of the electronic label are arranged at an end of the protrusion of the carrier,
whereby the protrusion and the contact pads form a plug for insertion in a socket.

7. The enrollment assistance device according to claim 5, wherein the plurality of contact pads of the power supply portion of the electronic label comprises a first contact pad for connection to a plus pole of a battery and a second contact pad for connection to a minus pole of a battery.

8. The enrollment assistance device according to claim 1, wherein the electronic label further comprises a visual feedback portion attached to the second side of the carrier.

9. The enrollment assistance device according claim 8, wherein the visual feedback portion comprises a display arrangement that is coupled to the card interface portion of the electronic label and controllable by signals received from the smartcard via the card interface portion.

10. An enrollment kit comprising:
   the enrollment assistance device according to claim 1; and
   a smartcard including a biometric arrangement and a power and communication interface.

11. A biometric system comprising:
   an enrollment assistance device, for facilitating biometric enrollment of a user of a smartcard including a biometric arrangement and a power and communication interface, the enrollment assistance device comprising:
   a carrier having a first side configured to face the smartcard during the biometric enrollment, and a second side opposite the first side; and
   an electronic label comprising:
   a card interface portion including an electrically conducting structure for interaction with the power and communication interface of the smartcard;
   a power supply portion including an electrically conducting structure for receiving electric power from a power source; and
   electrical circuitry connecting the electrically conducting structure of the power supply portion with the electrically conducting structure of the card interface portion to allow supply of power from the power source to the smartcard,
   wherein the electronic label is folded over an edge of the carrier in such a way that the card interface portion of the electronic label is attached to the first side of the carrier, and the power supply portion of the electronic label is attached to the second side of the carrier; and
   a smartcard including a biometric arrangement and a power and communication interface,
   wherein the power and communication interface of the smartcard is arranged in relation to the card interface portion of the electronic label of the enrollment assistance device in such a way that power can be provided from the enrollment assistance device to the smartcard.

12. A method of manufacturing an enrollment assistance device, comprising:
   providing a carrier having a first side and a second side opposite the first side, and an electronic label comprising a card interface portion, a power supply portion, and electrical circuitry connecting the power supply portion and the card interface portion;
   attaching at least the card interface portion of the electronic label to the first side of the carrier; and
   attaching at least the power supply portion of the electronic label to the second side of the carrier.

* * * * *